United States Patent
Yoo

Patent Number: 5,353,173
Date of Patent: Oct. 4, 1994

[54] DEVICE OF CONTROLLING HEAD-DRUM ANGLE AND METHOD THEREFOR

[75] Inventor: Jae C. Yoo, Seoul, Rep. of Korea

[73] Assignee: SamSung Electronics Co., Ltd., Kyungki-do, Rep. of Korea

[21] Appl. No.: 849,984

[22] Filed: Mar. 12, 1992

[30] Foreign Application Priority Data

Mar. 18, 1991 [KR] Rep. of Korea ............ 91-4242
Feb. 29, 1992 [KR] Rep. of Korea ............ 92-3397

[51] Int. Cl.$^5$ .................. G11B 5/588; H04N 5/783
[52] U.S. Cl. ........................ 360/76; 360/73.14; 360/84; 360/77.15
[58] Field of Search ............. 360/77.13, 77.16, 78.02, 360/107, 109, 76, 73.14, 73.15, 84

[56] References Cited

U.S. PATENT DOCUMENTS

| | | | |
|---|---|---|---|
| 3,697,676 | 10/1972 | Protas | 360/109 |
| 3,995,317 | 11/1976 | Schmidt | 360/109 |
| 4,101,937 | 7/1978 | Jenkins . | |
| 4,599,667 | 7/1986 | van Blerk | 360/106 |
| 4,703,370 | 10/1987 | Inoue et al. | 360/109 X |
| 4,796,124 | 1/1989 | Yokota et al. | 360/76 |
| 4,816,927 | 3/1989 | Rijckaert et al. | 360/77.13 X |
| 4,866,548 | 9/1989 | Rudi . | |
| 4,963,999 | 10/1990 | Utsunomiya et al. | 360/74.2 |
| 5,003,424 | 3/1991 | Grant | 360/130.23 X |
| 5,177,618 | 1/1993 | Dunlap et al. . | |
| 5,186,579 | 2/1993 | Hanamoto et al. . | |
| 5,187,617 | 2/1993 | Kaminaga | 360/64 |

OTHER PUBLICATIONS

Cox, Earl, *Fuzzy Fundamentals*, IEEE Spectrum, Oct. 1992, pp. 58–61.
Self, K., *Designing with Fuzzy Logic*, IEEE Spectrum, Nov. 1990 pp. 42–44 & 105.

*Primary Examiner*—Edward K. Look
*Assistant Examiner*—Michael S. Lee
*Attorney, Agent, or Firm*—Robert E. Bushnell

[57] ABSTRACT

A video cassette recorder, in which the head-drum angle is controlled by a control voltage which varies according to the tape speed detected from the frequency or a capstan motor applied by a frequency detecting portion at a first stage. Then, based upon the Fuzzy theory, the video head of head-drum can be maintained at a constant angle with the pitch (P) of a video tape independent of the tape speed by reproducing the control voltage by means of a detected membership function detected according to the gain difference (G) coming from a gain detecting portion.

23 Claims, 6 Drawing Sheets

FIG. 1A
PRIOR ART
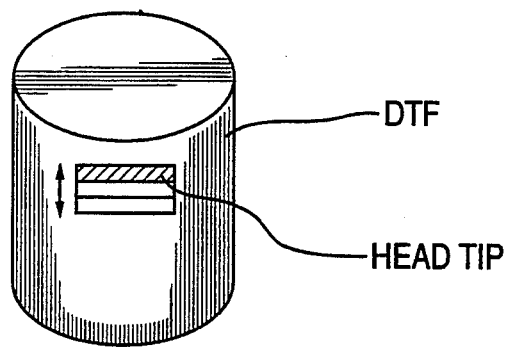
FIG. 1B
PRIOR ART
FIG. 1C
PRIOR ART
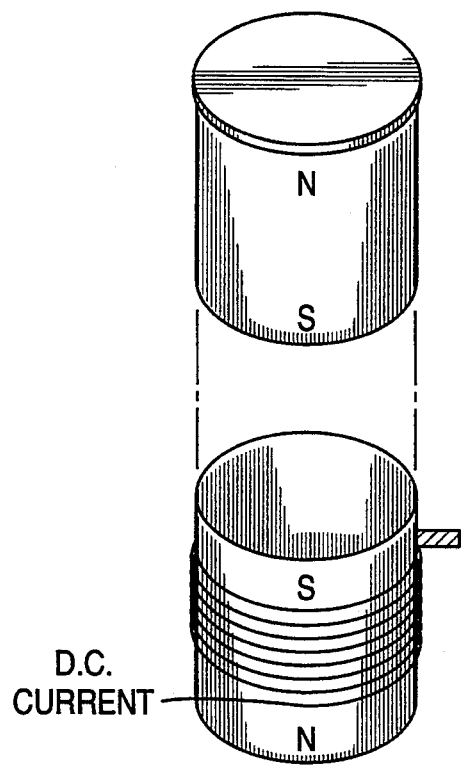
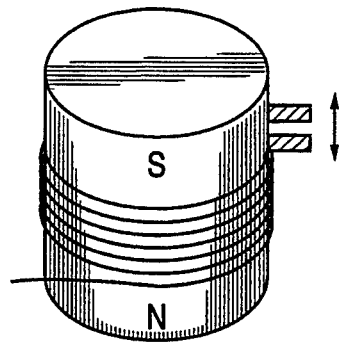
FIG. 1D
PRIOR ART
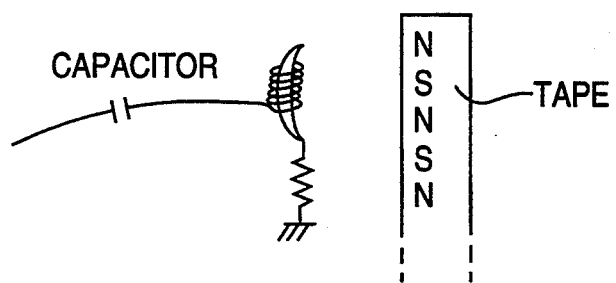

DEVICE OF CONTROLLING HEAD-DRUM ANGLE AND METHOD THEREFOR

BACKGROUND OF THE INVENTION

The present invention relates to a video cassette recorder (VCR), and more particularly to a device for controlling head-drum angle and method therefor, for ensuring a clear screen condition by controlling the angle of a video head-drum in accordance with the driving speed of a video tape.

In general, image signals are recorded on the video tape while predetermined angles as shown in FIG. 2 are maintained. In the case of VHS video tape, the angle $\theta$ between the tape and the video head of the head-drum is given by the following expression (1):

$$\theta = \tan^{-1} \frac{W}{\frac{\pi D}{2} \cos\theta \frac{VT}{fv}} \qquad (1)$$

where:

VT represents the driving speed of the video tape,

W represents the width of the video tape, measuring 10.07072139 millimeters,

D represents the diameter of the head-drum, measuring 62 millimeters, $\theta$ represents the driving angle of the head at the instant of suspending, measuring 5°56'7.38", and fv represents the vertical synchronizing frequency, where 59.94 Hertz is used for NTSC-type broadcasting and 50 Hertz is used for PAL-type broadcasting.

Therefore, there is only one variable in the above expression (1). As shown in FIG. 2, the speed of the video head can be expressed as a vector A, whereas the driving speed of the video tape can be expressed as a vector B. If a compound vector expressed as a vector C is adjusted to be coincident with the direction of a channel, the driving angle $\theta$ of the video head can be directed to the vector C so that the information recorded in one pitch P of tape can be detected exactly.

If a user changes the video tape recorder to a high speed mode, the driving speed of the video tape VT increases, the result of this change is that the driving angle $\theta$, as expressed in equation (1), of the video head is also varied. FIG. 3 shows the change of the driving angle $\theta$ of the video head in relation to the speed VT of the video tape and represented by vector C.

When detecting the image signals from the video tape, the driving angle $\theta$ of the video head should be coincident with one pitch of the video tape in order to get a good quality image display. If these two are different from each other, as shown in FIG. 3B, the video head could not detect the image signals exactly and noise will occur on the display screen during high or low speed playback modes of operation of the VCR.

Thus various attempts have been made in the prior art to correct for the disadvantages described above. For example, as shown in FIG. 1, there is a DTF (Dynamic Tracking Follow) device which comprises a cylindrical permanent magnet winding coil through which D.C. current flows. The constitution and operation thereof will be described below.

As shown in FIG. 1D, a capacitor is provided D.C. voltage, mixed with an A.C. signal read out from a magnetic tape, can be removed. A video head can be moved in a direction to diminish the angle difference of tracking in order to get a good quality image display.

However, the forgoing device can not cope with an abrupt variation in tape speed, i.e. greater than 10 times the current tape driving speed, because the variation of the video head speed is limited by the D.C. current.

SUMMARY OF THE INVENTION

An object of the present invention is to provide a device for controlling the head-drum angle, to ensure a clear screen condition at high or low speed playback modes, by means of a head-drum control device and a head tip displacement device using a D.C. current for control, in proportion to the driving speed of the video tape.

Another object of the present invention is to provide a device for controlling the head-drum angle which can control the angle of the video head in accordance with a gain of the video signal detected from the video head.

A further object of the present invention is to provide a method for controlling the angle of the head-drum for controlling the angle of the video head by detecting a gain of the video signal variation in accordance with the change of the video head angle.

To achieve these objects, the present invention provides a device for controlling the angle of the head-drum, comprising:

a gain detecting portion which detects the gain of the video signal read by the video head;

a frequency signal detecting portion which outputs the revolution frequency of a capstan motor in accordance with the revolution of the capstan motor;

a microcomputer connected to both the gain detecting portion and the frequency signal detecting portion for outputting a control voltage in accordance with the detected gain and frequency signal;

angle control means connected to the microcomputer which controls the angle of the head-drum in accordance with the control voltage output by the microcomputer; and head tip displacement control means for precisely changing the position of the head tip to diminish any remaining gain difference.

The present invention also provides a method for controlling the head-drum angle control device comprised of a gain detecting portion, a frequency detecting portion, a microcomputer, angle control means and head tip displacement control means, comprising the steps of:

entering a current reference gain into the microcomputer and detecting whether there is a variation in the tape driving speed;

performing a first angle control routine controlling the head-drum angle in accordance with the tape speed detected by the output of the frequency detecting portion;

detecting a gain difference of the video signal obtained performing head-drum angle control and comparing it with a first predetermined value T1;

performing a DTF control step if the gain difference is smaller than the first predetermined value;

performing a detected membership function setting routine setting a detected membership function by means of the gain difference of the video signal controlled by the head-drum angle control;

performing a compound routine function by compounding a preset membership function up to a maximum value into the detected membership function;

performing a weight center detecting step detecting the weight center of the composition membership function; and performing a second angle control routine controlling the head-drum angle by providing a control voltage in accordance with the weight center.

BRIEF DESCRIPTION OF THE DRAWINGS

These and other objects, features, and advantages of the present invention will become more apparent from the following description of the preferred embodiments taken in conjunction with the accompanying drawings, in which:

FIG. 1A shows a schematical perspective view of a conventional DTF;

FIG. 1B is an exploded view of the DTF shown in FIG. 1A;

FIG. 1C is a combining view of the DTF shown in FIG. 1B;

FIG. 1D is a circuit diagram of the convention DTF;

DETAILED DESCRIPTION OF THE PREFERRED EMBODIMENT

The present invention will now be described in more detail with reference to the accompanying drawings.

Figure 2:
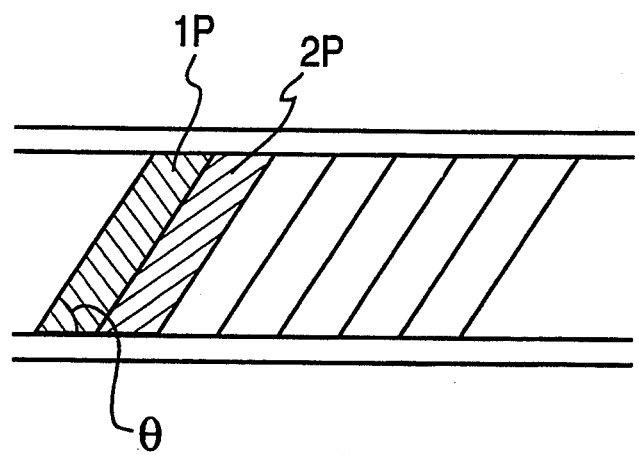
FIG. 2 is a diagram showing the feature of image recording on a video tape.
Figure 3A:
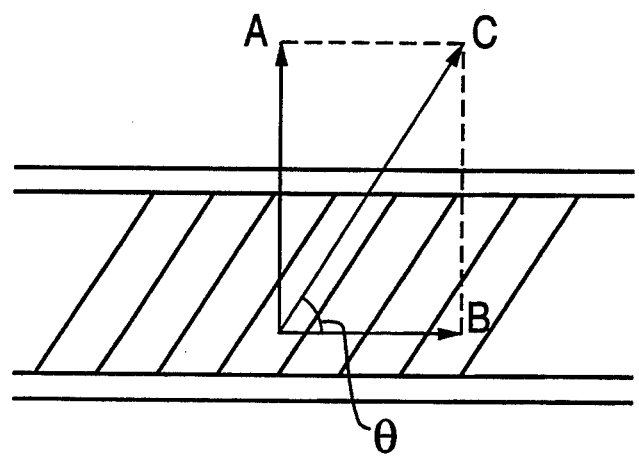
FIGS. 3A and 3B are vector diagrams showing vector amounts in accordance with the driving speed of the video tape and the speed of the video head.
Figure 3B:
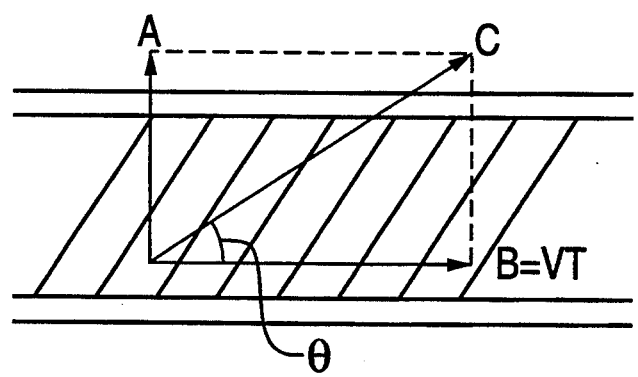
Figure 4:
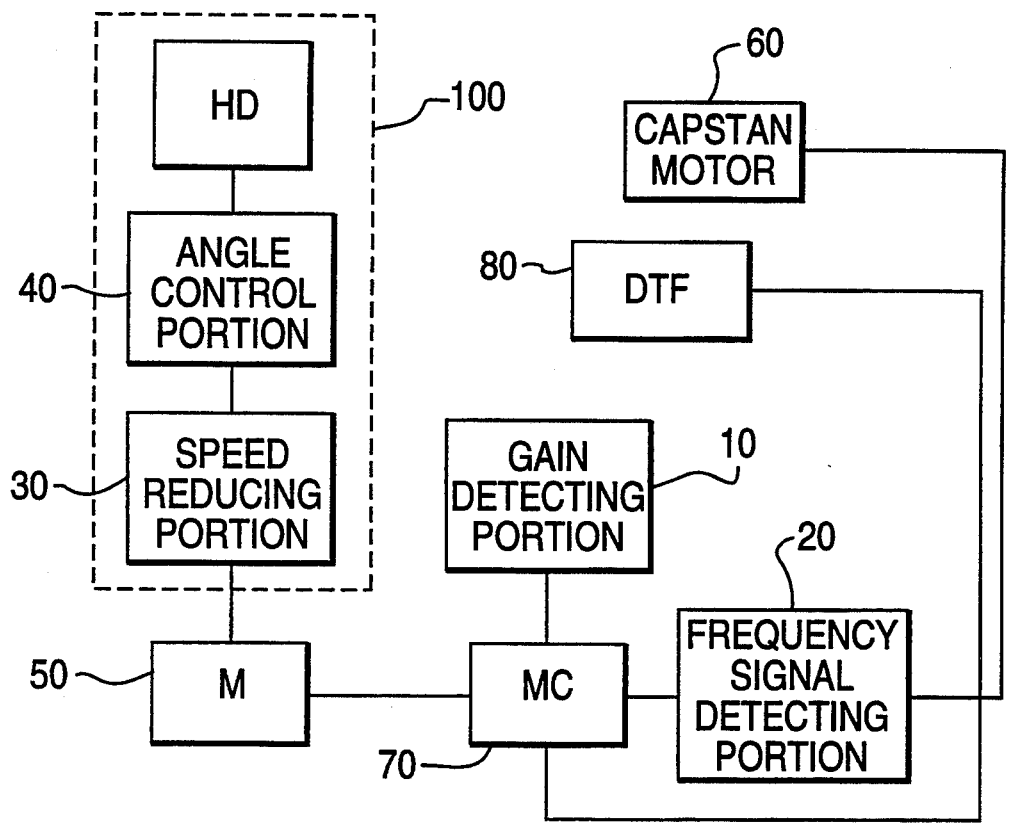
FIG. 4 is a block diagram of the head-drum angle control device according to the present invention.

FIG. 4 is a block diagram representing the device for controlling the head-drum angle, the device comprising a gain detection portion 10, a frequency signal detecting portion 20, motor 50, a DTF 80, a capstan motor 60, a microcomputer (hereinafter to be referred to as "MICOM") 70 and an angle control device 100.

More specifically, the gain detecting portion 10 detects the gain of the video signal read by the video head, and the frequency signal detecting portion 20 detects and outputs the revolution frequency of the capstan motor 60.

MICOM 70 is connected to both the gain detecting portion 10 and the frequency signal detecting portion 20 so that it can output a control voltage according to detected gain and revolution frequency CGF.

The angle control device 100, which is connected to the MICOM 70, controls the angle of the video head drum according to the control voltages output by the MICOM 70. A speed reducing portion 30 of the angle control device 100 is connected to motor 50, the motor 50 being driven by the control voltage.

Figure 5:
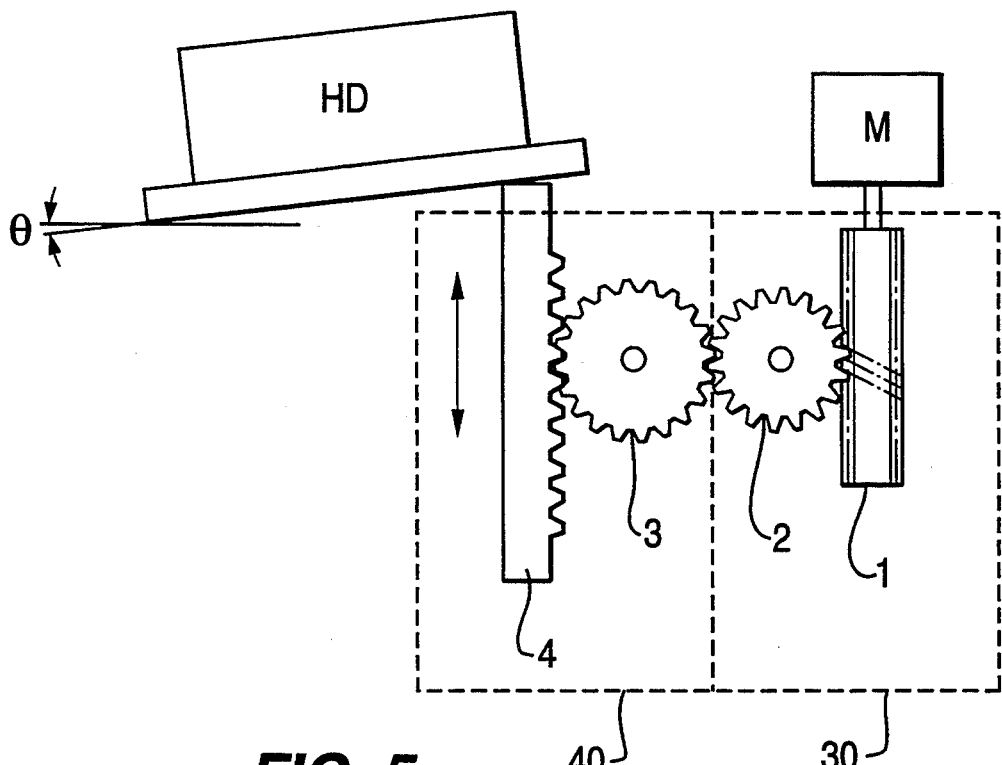
FIG. 5 is a front view showing the head-drum angle control device included in the device for controlling head-drum angle according to the present invention.

The speed reducing portion 30 is comprised of a worm 1 and a worm gear 2 as shown in FIG. 5, and reduces the revolution speed of motor 50 according to the worm 1 and worm gear 2.

The angle control portion 40 is connected to the speed reducing portion 30 so that the position angle of the head-drum HD can be changed by the linear movement of rack gear 4 in response to movement of the pinon gear 3 which is turned by worm gear 2.

Figure 6:
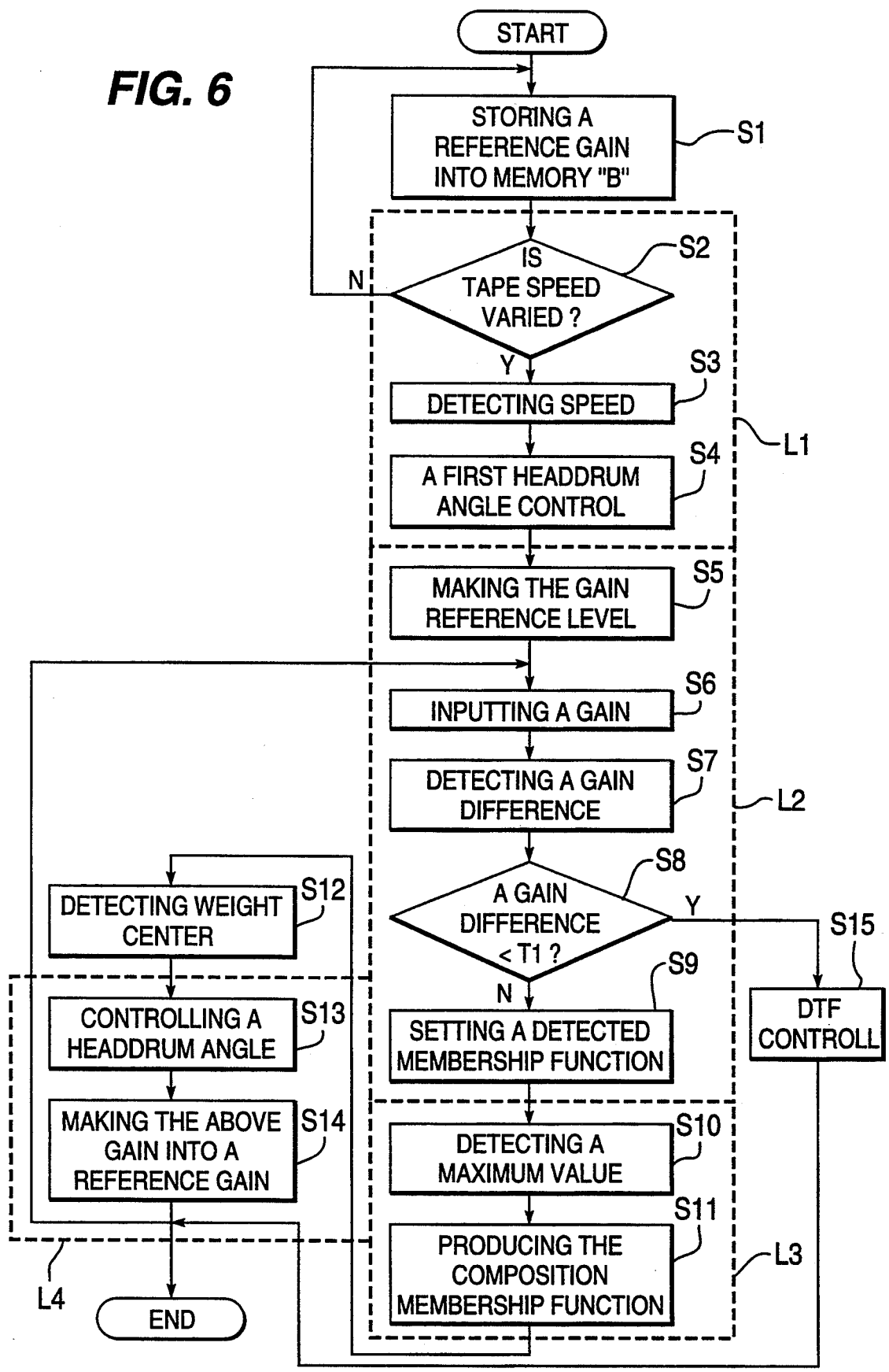
FIG. 6 is a flow chart describing the method for controlling head-drum angle according to the present invention.
Figure 8A:
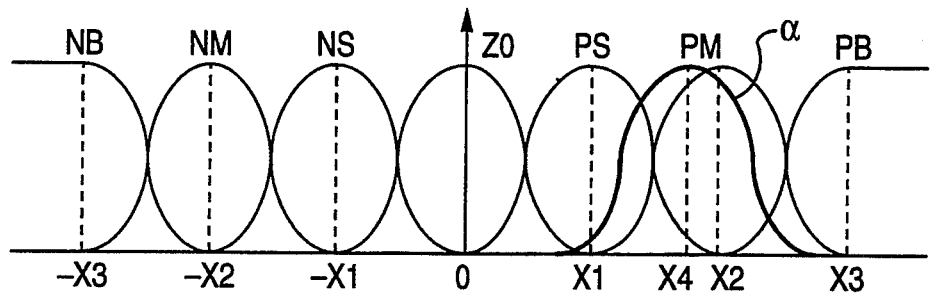
FIGS. 8A through 8D show the waveforms for the membership function of a gain difference detected from the device for controlling head-drum angle according to the present invention.

FIG. 6 shows a flowchart of the head-drum control method according to the present invention. MICOM 70 has the membership function such as shown in FIG. 8A according to the difference between gain signals applied from the gain detecting portion 10.

A membership function will be described more specifically hereinafter. It is assumed that the gain applied from the video signal gain detecting portion 10 is a first gain, whereas the gain applied after the first gain is the second gain. Gain "G" represents the subtraction of the first gain from the second gain, i.e. the second gain—the first gain. The value of the gain "G" can either be positive or negative, and depends upon the values of the first and second gains.

The user also can have a negative big NB membership function presuming the case that the value of "G" is "$-X3$". For the value "$-X3$" in NB membership function, the user chooses a value which can make the value "G" to be a big negative value.

Likewise, the user can have a negative small NS membership function presuming the case that the value of "G" is "$-X1$" which is a very small value for "G".

Also, the user applies "$-X2$" whose value is in the middle of "$-X3$" and "$-X1$", and, in this case, the value "G" becomes a negative medium NM membership function.

On the other hand, a value X3 can be presumed to make the value "G" be positive big, a value X2 to be positive medium, and a value X21 to be positive small. Accordingly, the PB (positive big), PS (positive small) and PM (positive medium) membership functions can be set for those values.

A ZO (Zero) membership function can be set by presuming a value which makes the first and second gains the same, resulting in the value "G" to be zero.

The membership functions are necessary to control the head-drum angle using the gain detecting block 10.

MICOM 70 performs step S1 for generating a reference gain as shown in FIG. 6 and for providing the reference gain to the first angle control routine L1, the detected membership function setting routine L2, the composition routine L3, the weight center position detecting step SA12 and the second angle control routine L4, in sequence.

More specifically, the first angle control routine L1 for controlling the head-drum angle according to tape speed detected by the frequency signal detecting portion 20 comprises a tape speed change decision step S2 for deciding whether the tape speed has been changed, a tape speed detecting step S3 for detecting the tape speed, and a first head-drum angle control step S4 for providing voltages used to control the head-drum HD angle according to the tape speed.

The detected membership function setting routine L2 for setting the detected membership function according to the gain difference G of the video signal by the control of the head-drum angle control comprises a first step S5 for making the gain applied from the gain detecting portion 10 zero level and deals with it as a first gain, a gain input step S6 for taking the gain of the angle-controlled head-drum and deals with it as a second gain, a gain difference detecting step S7 for producing the resulting value G of the difference between the first gain and the second gain, and a detected membership function setting step S9 for setting the detected membership function α according to the gain difference G.

The composition routine L3 for setting the composition membership function by compounding a preset membership function up to a maximum value into the detected membership function α comprises a maximum value detecting step S10 for detecting the maximum value from the preset membership function contained in the detected membership function α by comparing the preset membership function to the detected membership function α, a compound step S11 for setting the composition membership function by compounding the preset membership function up to a maximum value into the detected membership function α, and a weight center detecting step S12 for producing the weight center of the composition membership function after the compound step S11.

The second angle control routine L4 comprises, in sequence, a second head-drum angle control step S13 for controlling the head-drum HD angle by providing the control voltage according to the weight center of the composition function, and a first gain driving step S14 for making the gain output by the angle controlled head-drum HD as the second gain input step S6.

The device for controlling the head-drum angle constructed as above will be described in detail hereinafter.

The frequency signal detecting portion 20 inputs a predetermined frequency into MICOM 70 according to the revolution of the capstan motor.

The role of the capstan motor is to move the video tape toward a predetermined direction, whereas the tape speed can be detected from the speed of the capstan motor.

MICOM 70 inputs the reference gain to memory device "B" and recognizes the change of revolution frequency of the capstan motor by detecting the revolution speed of the capstan motor from the frequency signal detecting portion 20 in the tape speed change detecting step S2.

Then MICOM 70 detects the current tape speed in the speed detecting step S3 and performs the first head-drum angle control step S4 in which the control voltage responsive to the tape speed is applied to motor 50.

The motor 50 starts its operation in response to the control voltage, driving the worm 1 and thus the worm gear 2 into operation.

The reason for using the worm 1 and worm gear 2 is to reduce the revolution speed of the motor 50 because the revolution speed is too fast to precisely control the angle control device.

The revolution of the worm gear 2 is transferred to the pinion gear 3 which motivates the rack gear 4 to rectilinearly. Accordingly, the angle θ of the head-drum HD is controlled by the revolution of the motor 50.

In the case of a high speed operation of the tape, MICOM 70 outputs the control voltage to increase the angle of the head-drum HD in order to increase the driving angle θ of the video head, whereas it outputs the control voltages to lower the angle of the head drum HD in the case of low speed operation of the tape.

Because it is difficult to precisely control the angle θ of the head-drum HD using only the tape speed, MICOM 70 performs the detected membership function setting routine L@ by first performing step S5 which deals with the gain in zero level or a reference level as a first gain after making the video gain zero level.

Also, in the gain detecting block 10, MICOM 70 detects the gain of the video signal detected by the video head of the head-drum HD, the angle of the head-drum being controlled by the tape speed. After this operation, MICOM 70 performs the gain input step S6 which introduces the gain as the second gain.

Following this, MICOM 70 performs the comparison step S7 which produces the difference G between the first gain and the second gain, i.e. the second gain minus the first gain.

Further, MICOM 70 performs the comparison step S8 which compares the difference G between the first gain and the second gain with a first predetermined value T1 and performs DTF control step S15 in the case where the gain difference G is smaller than the first predetermined value T1.

Herein after, a DTF control step S15 using a DTF device will be described.

Figure 7:
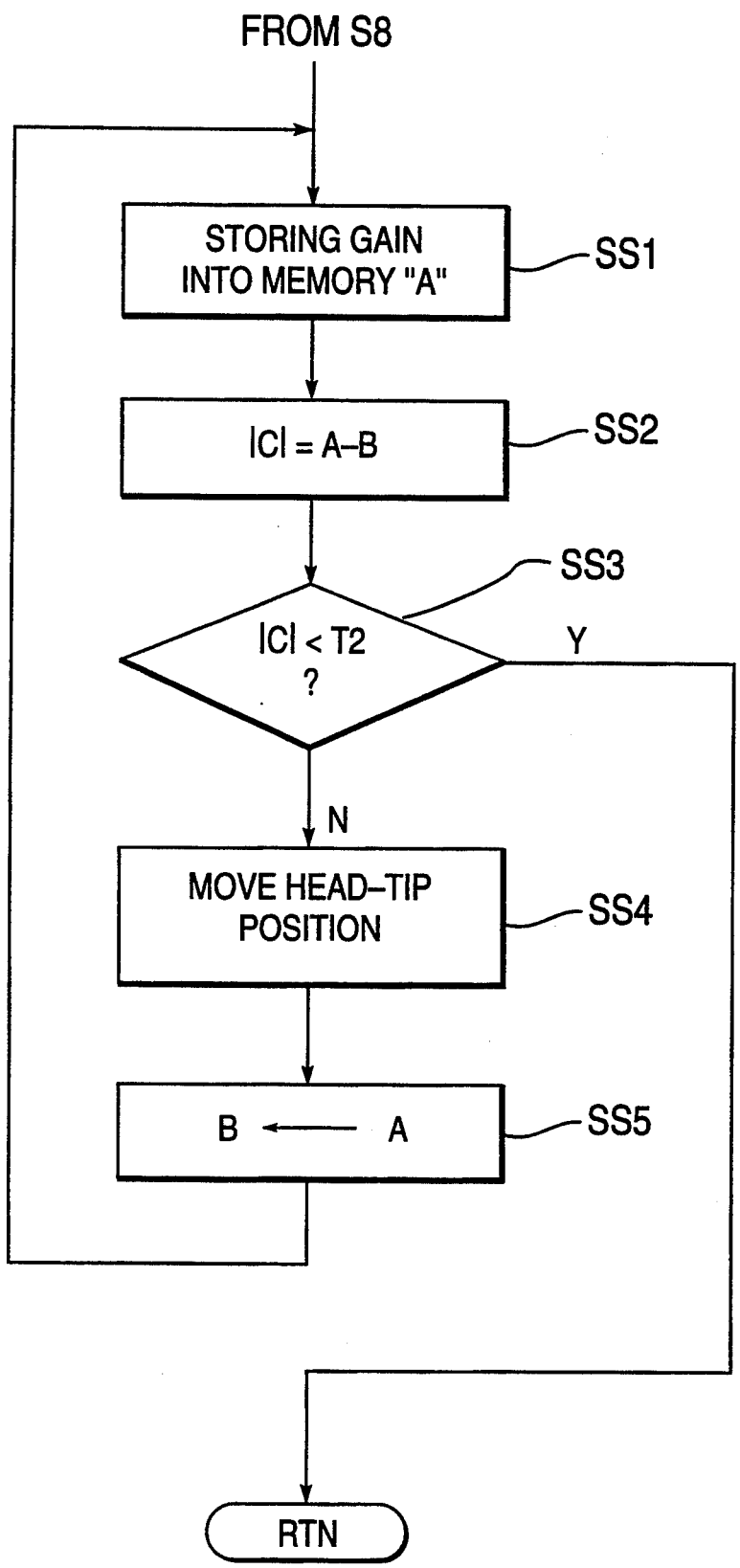
FIG. 7 is a flow chart of a head tip position control method in accordance with the present invention.

As shown in FIG. 7, it comprises the small steps of: storing gain in memory device "A" (step SS1), detecting the gain difference between the value stored in memory "A" and the value stored in the memory device "B" (step SS2), comparing the gain difference with a second predetermined value T2 (step SS3), moving a head tip position by controlling the amount of the current in response to the second predetermined value in order to correctly perform tracking of the video tape (step SS4), storing in memory device "B", as the reference value, the value stored in memory device "A" and returning to step SS1.

Further, MICOM 70 sets the detected membership function α according to the gain difference G, as shown in FIG. 6, by performing the detected membership function setting step S9. The detected membership function α, as shown in FIG. 8A, represents the gain difference G having the value X4.

The distribution of the detected membership function α depends upon the intent of users.

MICOM 70 performs the maximum value detecting step S10.

Figure 8B:
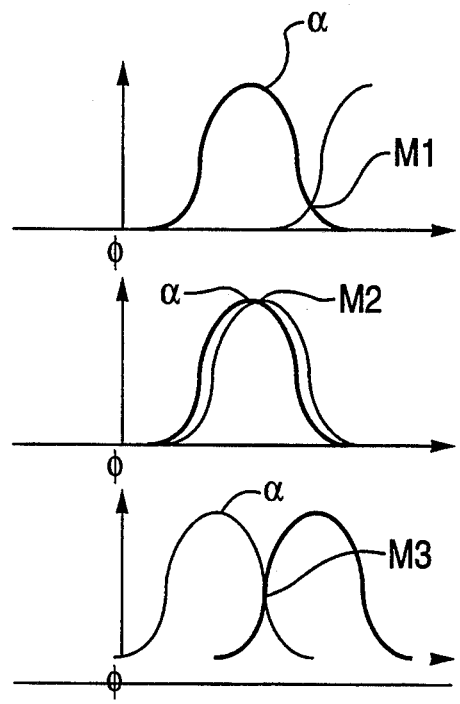

The maximum value detecting step S10 detects whether the present membership function, such as NB, NM, NS, ZO, PS, PM and PB, in the MICOM 70, as shown in FIG. 8B, include the detected membership function α. In this case, it is found that the detected membership function α is included in the present membership functions PB, PM and PS.

Figure 8C:
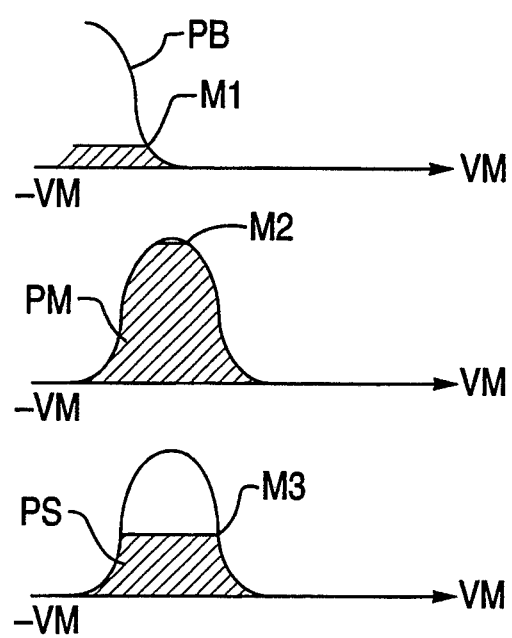
Figure 8D:
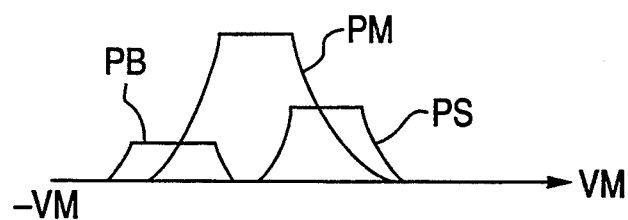

As shown in FIG. 8C, MICOM 70 produces the maximum values M1, M2 and M3 among the present membership functions PB, PM and PS in which the detected membership function α is included. After this, MICOM 70 produces the composition function as shown in FIG. 8D by performing the composition step S11 which compounds the wave shapes of the present membership functions PB, PM and PS which is marked according to the maximum values M1, M2 and M3 in FIG. 8C.

Also, MICOM 70 produces the control voltage corresponding to the weight center value after performing weight center detecting step S12 which produces the weight center of the composition function.

Because the weight center of the composition function has a different value according to the gain difference G, the control voltage VM should be the value controlling the motor resulting in the gain difference G to be reduced.

In consequence, the motor 50 controls the angle control device 100 according to the control voltage, thus the angle of the head-drum HD is controlled according to video tape speed.

To get a more precise angle of the head-drum HD, MICOM 70 performs the feedbacks into the second gain input step S6 after doing the first gain driving step S14 which the gain detected from the second gain input step S6 is again made to act as a first gain.

Accordingly, MICOM 70 produces the detected membership function α according to the gain difference G again and produces the control voltage according to the weight center of the wave shape set to the maximum values of the present membership function and is repeatedly performed until being smaller than the first predetermined value T1. If a controlled gain difference is smaller than the first predetermined value T1, DTF control step S15 is performed. Thus, the video head could maintain the constant value conforming to the pitch, independent of the video tape speed.

In the present invention, in other words, the tape speed is detected from the revolution frequency of the capstan motor detected by the frequency signal detecting portion, and by using the control voltage according to the tape speed, the angle of the head-drum is controlled at the first stage.

If a controlled gain difference is smaller than the first predetermined value T1, DTF control step S15 is performed.

Also, using the fuzzy theory, the control voltage is produces by the detected membership function according to the gain difference detected from the gain detecting block, and if a controlled gain difference is smaller than the first predetermined value T1, DTF control step S15 is performed, whereby the head-drum can always be in the same direction as that of the pitch of the video tape, independent of the variation in speed of the video tape.

The invention is in no way limited to the embodiment described hereinabove. Various modification of the disclosed embodiment as well as other embodiments of the invention will become apparent to persons skilled in the art upon reference to the description of the invention. It is therefore contemplated that the appended claims will cover any such modifications of embodiments as fall within the true scope of the invention.

What is claimed is:

1. A device for controlling the head-drum angle, comprising:
    a gain detecting portion for detecting a gain of a video signal read by a video head;
    a frequency signal detecting portion for providing a revolution frequency signal in dependence upon a revolution speed of a capstan motor;
    a microcomputer connected to said gain detecting portion and said frequency signal detecting portion to provide a control voltage according to said gain and said revolution frequency signal;
    angle control means connected to said microcomputer for controlling an angle of the head-drum according to said control voltage of said microcomputer, said angle control means comprising:
        a motor which is driven by said control voltage;
        a speed reducing portion connected to said motor for reducing a revolution speed of said motor, said speed reducing portion comprising:
            a worm connected to said motor; and
            a worm gear connected to said worm;
        an angle control portion connected to said speed reducing portion for changing the angle of the head-drum by a rectilinear movement; and
    head tip displacement control means for controlling a head tip position of a head by means of said microcomputer.

2. The device according to claim 1, wherein said angle control portion comprises:
    a pinion gear connected to said speed reducing portion; and
    a rack gear connected to said pinion gear.

3. The device according to claim 1, wherein said microcomputer stores a plurality of membership functions in a set in response to a gain difference of said video signal coming from said gain detecting portion.

4. A method for controlling a head-drum angle according head-drum angle device comprising a gain detecting block, a frequency signal output block, a microcomputer, and an angle control means, said method comprising:
    a step for storing a reference gain into a first memory device in the microcomputer;
    a first angle control routine for controlling the head-drum angle according to a tape speed which is detected by said frequency signal output portion;
    a detected membership function for setting a detected membership function by means of a gain difference of a video signal controlled by head-drum angle control;
    a DTF control step for controlling a head tip position of a head when said gain difference is less than a predetermined value;
    a compound routine for setting a compound function by compounding a preset membership function up to maximum value into the detected membership function;
    a weight center detecting step for producing a weight center of the compound membership function; and
    a second angle control routine for controlling said head-drum angle by producing a control voltage according to the weight center.

5. The method according to claim 4, wherein said first angle control routine comprising:
    a tape speed decision step for deciding whether the tape speed has changed;
    a speed detection step for detecting tape speed; and
    a first head-drum angle control step for providing voltages used to control the head-drum angle according to the tape speed.

6. The method according to claim 4, said detected membership function setting routine comprising:
    a first gain input step for making the gain applied from said gain detecting block zero level or a reference level to provide a first gain;
    a second gain input step for taking the gain of the angle-controlled head-drum to provide a second gain;
    a gain difference detecting step for producing a gain difference between said first gain and said second gain;
    a comparison step for comparing a predetermined value with said gain difference; and a detected membership function setting step for producing the detected membership function according to said gain difference.

7. The method according to claim 6, wherein said second angle control routine comprises:
a second head-drum angle control step for controlling the head-drum angle by producing the control voltage according to the weight center of the composition function; and
a first gain driving step for making the gain from said second gain input step into said first gain.

8. The device according to claim 4, said compound routine comprising:
a maximum value detecting step for producing a maximum value of said preset membership function contained in said detected membership function which is known by comparing the preset membership function to the detected membership function; and
a compound step for producing the composition membership function which results from the process that compounds the preset membership function up to said maximum value into said detected membership function.

9. The head-drum control method according to claim 4, wherein said DTF control step comprises the steps of:
storing gain in a second memory device;
detecting said gain difference between a value stored in said second memory device and a value stored in said first memory device;
comparing said gain difference with a second predetermined value;
changing a head tip position by controlling an amount of current in response to said second predetermined value in order to correctly perform tracking of the video tape;
making a value stored in the second memory device a reference value and performing feed back to said step of storing gain in said second memory device.

10. An head dram angle control device for adjusting an angle between a video head located on a head drum and a video tape driven by a capstan motor, said head drum angle control device comprising:
gain detection means for detecting a gain of a video signal read by the video head;
frequency detection means for determining a revolution speed of the capstan motor to generate a frequency signal;
angle control means for adjusting the angle between the video head by moving the head drum and the video tape in response to a control voltage;
processing means for providing said control voltage in response to frequency signal and then providing said control voltage in response to said gain of the video signal; and
head tip control means for controlling a head tip position in response to said control voltage, wherein said angle control means comprises:
motor means for operating in response to said control voltage;
speed reduction means connected to said motor for creating a rotation at a speed less than a speed of said motor means;
head drum adjustment means connected to said speed reduction means for moving the head drum by a rectilinear movement in response to said rotation of said speed reduction means, and said speed reduction means comprises:
a worm connected to said motor means and powered by said motor means; and
a worm gear connected to said motor means for creating said rotation.

11. The device as claimed in claim 10, wherein said head drum adjustment means comprises:
a pinion gear connected to said worm gear;
a rack gear connected to said worm gear for generating said rectilinear movement.

12. The device as claimed in claim 10, wherein said processing means stores a plurality of preset membership functions, generates a detected membership function in response to said gain, and produces a composition function in response to a comparison of said preset membership functions and said detected membership function.

13. A method of adjusting an angle between a video head located on a head drum and a video tape driven by a capstan motor, said method comprising the steps of:
storing a reference gain;
performing a first adjustment of the head drum based on a frequency of rotation of the capstan motor;
setting a detected membership function based on a gain difference of a video signal received by the video head;
setting a composition function by compounding a preset membership function up to a maximum value into said detected membership function;
controlling a head tip position if said gain difference is less than a first predetermined value; and
detecting a weight center of said composition function;
performing a second adjustment of the head drum based on said weight center of said composition function.

14. The method as claimed in claim 13, wherein said step of performing a first adjustment comprises the steps of:
making a determination whether a variance in a speed of the video tape has occurred;
detecting said speed of the video tape if said variance has occurred; and
moving the head drum to adjust the angle between the video head and the video tape based on said speed of the video tape.

15. The method as claimed in claim 14, wherein said step of setting a detected membership function comprises the steps of:
making a gain of the video signal detected by the video head a reference level to generate a first gain;
receiving a gain of the head drum as a second gain;
subtracting said first gain from said second gain to produce said gain difference;
setting said detected membership function in dependence upon said gain difference if said gain difference is greater than said first predetermined value.

16. The method as claimed in claim 15, wherein said step of setting a composition function comprises the steps of:
generating a maximum value from said preset membership function contained in said detected membership function by comparing each preset membership function with said detected membership function; and
setting said composition function by compounding said preset membership function up to said maximum value into said detected membership function.

17. The method as claimed in claim 16, wherein said step of performing a second adjustment of the head drum comprises the steps of:
moving the head drum to adjust the angle between the video head and the video tape in dependence upon said weight center;
enabling generation of said second gain as said first gain.

18. The method as claimed in claim 17, wherein said step of controlling a head tip position comprises the steps of:
storing a gain of said video signal;
subtracting said reference gain from said gain of said video signal to generate said gain difference;
moving the head tip position if said gain difference is less than a second predetermined value;
substituting said gain of said video signal as said reference gain.

19. The method as claimed in claim 18, further comprising said step of:
enabling generation of said gain of said video signal as said reference gain if said gain difference is less than said second predetermined value.

20. The method as claimed in claim 13, wherein said step of setting a detected membership function comprises the steps of:
making a gain of the video signal detected by the video head a reference level to generate a first gain;
receiving a gain of the head drum as a second gain;
subtracting said first gain from said second gain to produce said gain difference;
setting said detected membership function in dependence upon said gain difference if said gain difference is not less than said first predetermined value.

21. The method as claimed in claim 20, wherein said step of performing a second adjustment of the head drum comprises the steps of:
removing the head drum to adjust the angle between the video head and the video tape in dependence upon said weight center;
enabling generation of said second gain as a first gain.

22. The method as claimed in claim 13, wherein said step of setting a composition function comprises the steps of:
generating a maximum value from said preset membership function contained in said detected membership function by comparing each preset membership function with said detected membership function; and
setting said composition function by compounding said preset membership function up to said maximum value into said detected membership function.

23. The method as claimed in claim 13, wherein said step of controlling a head tip position comprises the steps of:
storing a gain of said video signal;
subtracting said reference gain from said gain of said video signal to generate said gain difference;
moving the head tip position if said gain difference is less than a second predetermined value;
substituting said gain of said video signal as said reference gain.

* * * * *

UNITED STATES PATENT AND TRADEMARK OFFICE
CERTIFICATE OF CORRECTION

PATENT NO. : 5,353,173
DATED : 4 October 1994
INVENTOR(S) : Jae- Chern Yoo

It is certified that error appears in the above-indentified patent and that said Letters Patent is hereby corrected as shown below:

On the title page item [75], Change "Jae C. Yoo" to --Jae- Chern Yoo--:

Signed and Sealed this

Fifteenth Day of October, 1996

*Attest:*

BRUCE LEHMAN

*Attesting Officer*    *Commissioner of Patents and Trademarks*